(12) United States Patent
DeVaul (10) Patent No.: US 9,266,598 B1
(45) Date of Patent: Feb. 23, 2016

(54) REACTIONARY MASS BALLOON ENVELOPE FOR A BALLOON AND OTHER BALLOON COMPONENTS

(71) Applicant: Google Inc., Mountain View, CA (US)

(72) Inventor: Richard Wayne DeVaul, Mountain View, CA (US)

(73) Assignee: Google Inc., Mountain View, CA (US)

( * ) Notice: Subject to any disclaimer, the term of this patent is extended or adjusted under 35 U.S.C. 154(b) by 29 days.

(21) Appl. No.: 14/227,559

(22) Filed: Mar. 27, 2014

Related U.S. Application Data (60) Provisional application No. 61/882,847, filed on Sep. 26, 2013.

(51) Int. Cl.
*B64B 1/42* (2006.01)

(52) U.S. Cl.
CPC .......................................... *B64B 1/42* (2013.01)

(58) Field of Classification Search
CPC .............. B64B 1/20; B64B 1/22; B64B 1/40; B64B 1/42; B64B 1/70
See application file for complete search history.

(56) References Cited

U.S. PATENT DOCUMENTS

| | | | | |
|---|---|---|---|---|
| 1,304,858 | A | * | 5/1919 | Decowski ..................... 244/127 |
| 3,069,114 | A | * | 12/1962 | Maas ............................... 244/31 |
| 3,072,367 | A | * | 1/1963 | Evanick et al. ................. 244/32 |
| 3,393,769 | A | * | 7/1968 | Springer ......................... 182/82 |
| 3,698,667 | A | * | 10/1972 | Studenick et al. .............. 244/32 |
| 6,224,015 | B1 | * | 5/2001 | Reinhard ........................ 244/24 |
| 6,425,552 | B1 | | 7/2002 | Lee et al. |
| 7,046,934 | B2 | | 5/2006 | Badesha et al. |
| 7,185,848 | B2 | * | 3/2007 | Heaven et al. ................. 244/93 |
| 8,061,647 | B1 | | 11/2011 | Powell |
| 8,833,696 | B1 | * | 9/2014 | Teller et al. .................... 244/96 |
| 2006/0060695 | A1 | * | 3/2006 | Walden et al. ................. 244/24 |
| 2012/0138733 | A1 | | 6/2012 | Hiebl et al. |
| 2013/0007935 | A1 | | 1/2013 | Chin et al. |

* cited by examiner

*Primary Examiner* — Joseph W Sanderson (74) *Attorney, Agent, or Firm* — McDonnell Boehnen Hulbert & Berghoff LLP (57) ABSTRACT

The present disclosure provides a balloon. The balloon may include an envelope comprising a fixed component. The balloon may include a stabilizing platform positioned beneath the envelope and operatively connected to the fixed component. The stabilizing platform may be configured to rotate around an axis vertically aligned with gravity. The envelope may comprise a heavier mass than the stabilizing platform. The balloon may also include a motor configured to exert a first force on the stabilizing platform in a manner such that the stabilizing platform rotates (i) more than a rotation of the balloon and (ii) around the axis, thereby counteracting the rotation of the balloon by causing the stabilizing platform to exert a second force on the envelope of the balloon.

20 Claims, 7 Drawing Sheets

REACTIONARY MASS BALLOON ENVELOPE FOR A BALLOON AND OTHER BALLOON COMPONENTS

CROSS-REFERENCE TO RELATED APPLICATIONS

The present non-provisional utility application claims priority under 35 U.S.C. §119(e) to provisional application number U.S. 61/882,847 filed on Sep. 26, 2013, the entire contents of which are herein incorporated by reference.

BACKGROUND

Balloons that operate at high altitudes are affected by outside forces such as winds or jetstreams. These outside forces may cause the balloon to rotate which in turn may prevent a payload of the balloon from maintaining a fixed orientation. A stabilization mechanism may be needed to compensate for rotation caused by the outside forces such that the payload may maintain a fixed orientation.

SUMMARY

Within examples, a balloon is provided that is configured to use a balloon envelope as a reactionary mass for the balloon and other balloon components.

In a first aspect, a balloon is provided. The balloon may include an envelope comprising a fixed component. The balloon may also include a stabilizing platform positioned beneath the envelope and operatively connected to the fixed component. The stabilizing platform may be configured to rotate around an axis vertically aligned with gravity, and the envelope may include a heavier mass than the stabilizing platform. The balloon may additionally include a motor configured to exert a first force on the stabilizing platform in a manner such that the stabilizing platform rotates (i) more than a rotation of the balloon and (ii) around the axis, thereby counteracting the rotation of the balloon by causing the stabilizing platform to exert a second force on the envelope of the balloon.

In a second aspect, a method is provided. The method may include, determining, using a processor, a rotation of a balloon with a predetermined orientation. The balloon may include an envelope and a stabilizing platform. The envelope may include a fixed component, and the stabilizing platform (i) may be operatively connected to the fixed component, (ii) may be positioned beneath the envelope, (iii) may be configured to rotate around an axis vertically aligned with gravity, and (iv) may include a motor. The method also may include causing, using the motor, the stabilizing platform to rotate in a manner so as to counteract the rotation of the balloon thereby returning the balloon to the predetermined orientation.

In a third aspect, a non-transitory computer readable medium having stored therein instructions that when executed by a computer system of a balloon cause the balloon to perform functions is provided. The functions may include determining a rotation of the balloon. The balloon may have predetermined orientation, and the balloon may include an envelope and a stabilizing platform. The envelope may include a fixed component, and the stabilizing platform (i) may be operatively connected to the fixed component, (ii) may be positioned beneath the envelope, (iii) may be configured to rotate around an axis vertically aligned with gravity, and (iv) may include a motor. The functions may also include causing, using the motor, the stabilizing platform to rotate in a manner so as to counteract the rotation of the balloon and thereby return the balloon to the predetermined orientation.

These as well as other aspects, advantages, and alternatives, will become apparent to those of ordinary skill in the art by reading the following detailed description, with reference where appropriate to the accompanying drawings.

DETAILED DESCRIPTION

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Example embodiments may help to provide movement control and stabilization for a balloon in a data network that includes a plurality of balloons; for example, a mesh network formed by high-altitude balloons deployed in the stratosphere. Since outside forces such as winds in the stratosphere may affect the movement, stability, and components of a given balloon in an example network, each balloon in the example network may be configured to move in a manner that may counteract such forces and may stabilize both the balloon and the particular components of the balloon.

In some instances, various components can be added to the balloon and used to facilitate stabilization. For example, a ring-laser gyroscope or other similar device may be used as a reaction wheel and may be added to the payload of the balloon. Upon determining a differential in a predetermined trajectory of the balloon, components of a balloon may push against the gyroscope in order to stabilize and/or counteract the outside wind forces without using any reactionary mass. However, utilizing reaction wheels in this manner may require additional components to be added to the balloon and, in some instances, it may be difficult to integrate the additional components. For example, many reaction wheels require electric motors to rotate the reaction wheel and the addition of both the reaction wheels and the electronic motors may increase the weight of the balloon, which may be undesirable for various reasons. Moreover, the additional components required to integrate the reaction wheels may render the balloon prohibitively expensive to manufacture.

Example embodiments may help to stabilize components of a high-altitude balloon without the need for additional mechanisms such as the reaction wheels described above. For instance, an example embodiment may help to provide stability and control by providing a configuration that takes advantage of the weight and size of the envelope of the balloon, and uses the balloon envelope itself as a reactionary mass. The weight of the envelope of the balloon may allow the balloon to generally maintain its position, due to gravity, and any strong forces or "pushes" made against the envelope can, overtime, be offset or damped out in the form of viscous drag. Stated differently, the envelope of the balloon may serve as a momentum sink that radiates momentum captured by the envelope away in the form of viscous drag. Knowing this, an unstable balloon may be configured to utilize a stabilizing platform to rotate against the envelope of the balloon knowing it will not cause the balloon to shift drastically, in attempt to counteract the undesired outside forces.

Accordingly, embodiments disclosed herein may involve measuring or determining the rotation of a given balloon in the network that may, for example, be rotating in an undesired manner due to extraneous winds, and causing a stabilizing platform to rotate (or push) against an envelope of the balloon in attempt to counteract the undesired rotation.

For example, in an example balloon network, the balloons may communicate with one another using various communication types. Such communication types may include the use of lasers, bright LEDs, or radio-frequency (RF) communications. To effectively communicate with one another the components of these communication techniques may rely on the stability and orientation of the communication devices. For instance, a given balloon may obtain clear and efficient RF communication when an antenna is oriented in a certain manner. However, excessive winds may inhibit such orientation, and it may be desirable to employ methods and systems that can re-orient (e.g., pivot) and stabilize such devices.

To do so, the balloon may be configured to rotate a stabilizing platform against the envelope of the balloon in a manner that may counteract the undesired rotation and may re-pivot the antenna to the correct position. The platform may be configured to rotate along a vertical axis that is vertically aligned with gravity and may rotate against the mass of the envelope of the balloon. For instance, using a laser gyroscope, magnetic compass or other device it may be determined whether a given balloon is turning in a certain direction and thereby, for example, changing the orientation of an antenna. Once determined, the stabilizing platform may be rotated in a manner that compensates (e.g., rotates in an opposite direction as that of the balloon) for the undesired movement of the balloon and may allow the balloon to re-orient the antenna.

Figure 1:
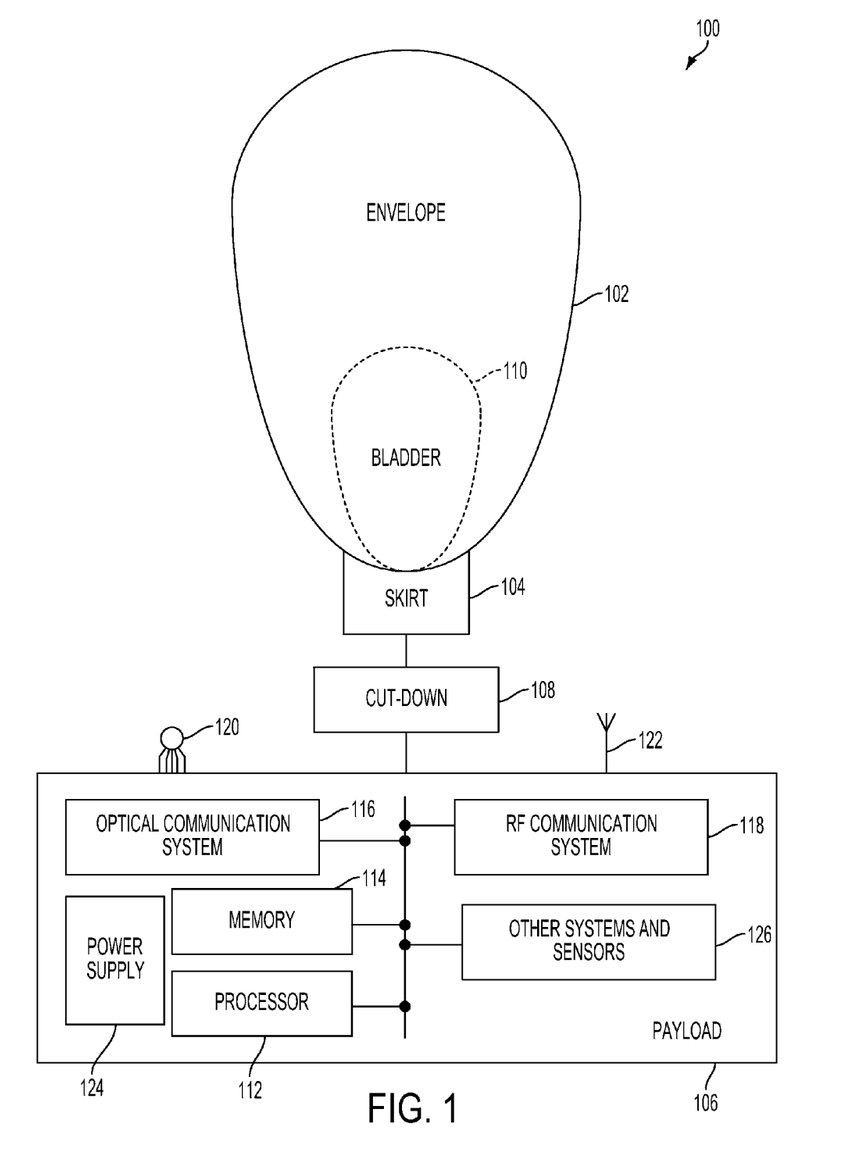
FIG. 1 is a simplified block diagram illustrating a high-altitude balloon, according to an example embodiment.

Various types of balloon systems may be incorporated in an exemplary balloon network. An exemplary embodiment may utilize high-altitude balloons, which typically operate in an altitude range between 17 km and 22 km. FIG. 1 is a simplified block diagram illustrating a high-altitude balloon 100, according to an exemplary embodiment. As shown, the balloon 100 includes an envelope 102, a skirt 104, a payload 106, and a cut-down system 108 that is attached between the envelope 102 and payload 106.

The envelope 102 and skirt 104 may take various forms, which may be currently well-known or yet to be developed. For instance, the envelope 102 and/or skirt 104 may be made of a highly-flexible latex material or may be made of a rubber material such as chloroprene. Other materials are also possible. Further, the shape and size of the envelope 102 and skirt 104 may vary depending upon the particular implementation. Additionally, the envelope 102 may be filled with various different types of gases, such as helium and/or hydrogen. Other types of gases are possible as well. In some embodiments the envelope may take a form similar to an envelope of a Rozière balloon in which the envelope may include separate chambers (or partitions) for a non-heated lifting gas (e.g., hydrogen or helium) as well as a heated lifting gas (e.g., the headed gas that may be used in operation of a hot air balloon or Montgolfière).

The payload 106 of balloon 100 may include a processor 112 and on-board data storage, such as memory 114. The memory 114 may take the form of or include a non-transitory computer-readable medium. The non-transitory computer-readable medium may have instructions stored thereon, which can be accessed and executed by the processor 112 in order to carry out the balloon functions described herein.

The payload 106 of balloon 100 may also include various other types of equipment and systems to provide a number of different functions. For example, payload 106 may include optical communication system 116, which may transmit optical signals via an ultra-bright LED system 120, and which may receive optical signals via an optical-communication receiver (e.g., a photo-diode receiver system). Further, payload 106 may include an RF communication system 118, which may transmit and/or receive RF communications via an antenna system 122. The payload 106 may also include a power supply 124 to supply power to the various components of balloon 100.

Further, payload 106 may include various types of other systems and sensors 126. For example, payload 106 may include one or more video and/or still cameras, a GPS system, various motion sensors (e.g., accelerometers, gyroscopes, and/or compasses), and/or various sensors for capturing environmental data. Moreover, a rotational interface may be includes in payload 106, which may be used to measure rotation. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 100 includes an ultra-bright LED system 120 for free-space optical communication with other balloons. As such, optical communication system 116 may be configured to transmit a free-space optical signal by modulating the ultra-bright LED system 120. The optical communication system 116 may be implemented with mechanical systems and/or with hardware, firmware, and/or software. Generally, the manner in which an optical communication system is implemented may vary, depending upon the particular application. Additionally, in some embodiments, the balloon 100 may include a laser (not shown in FIG. 1) that may be used for free-space optical communication. The laser may be used in addition to or as an alternative to the ultra-bright LED system 120, for example.

In a further aspect, balloon 100 may be configured for altitude control. For instance, balloon 100 may include a variable buoyancy system, which is configured to change the altitude of the balloon 300 by adjusting the volume and/or density of the gas in the balloon 100. A variable buoyancy system may take various forms, and may generally be any system that can change the volume and/or density of gas in envelope 102.

In an exemplary embodiment, a variable buoyancy system may include a bladder 110 that is located inside of envelope 102. The buoyancy of the balloon 100 may therefore be adjusted by changing the density and/or volume of the gas in bladder 110. To change the density in bladder 110, balloon 100 may be configured with systems and/or mechanisms for heating and/or cooling the gas in bladder 110. Further, to change the volume, balloon 100 may include pumps or other features for adding gas to and/or removing gas from bladder 110. Additionally or alternatively, to change the volume of bladder 110, balloon 100 may include release valves or other features that are controllable to allow air to escape from bladder 110.

Further, a balloon 106 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system make then make adjustments to the density of the balloon chamber in order to effectuate the determined altitudinal adjustments and cause the balloon to move laterally to the desired direction and/or to the desired location. Alternatively, the altitudinal adjustments may be computed by a ground-based control system and communicated to the high-altitude balloon.

As shown, the balloon 100 also includes a cut-down system 108. The cut-down system 108 may be activated to separate the payload 106 from the rest of balloon 100. This functionality may be utilized anytime the payload needs to be accessed on the ground, such as when it is time to remove balloon 100 from a balloon network, when maintenance is due on systems within payload 106, and/or when power supply 124 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground.

Figure 2:
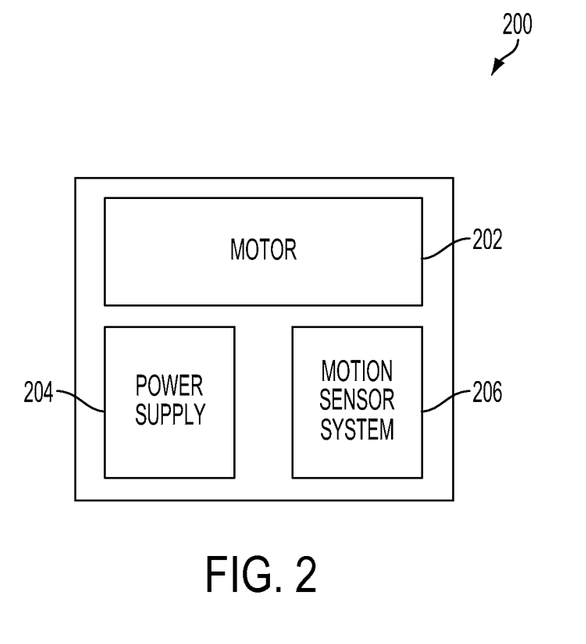
FIG. 2 is a simplified block diagram illustrating a stabilizing platform, according to an example embodiment.

FIG. 2 is a simplified block diagram illustrating a stabilizing platform 200 according to an exemplary embodiment. Stabilizing platform 200 may be operatively connected to a balloon the same as or similar to balloon 100 of FIG. 1, and for ease of explanation the balloon stabilizing platform 200 is connected to will be referenced as balloon 100. Stabilizing platform 200 may include a motor 202, power supply 204 and motion sensor system 206. Although various platform shapes may be used, in this embodiment the stabilizing platform 200 may take the form of a rectangular shaped platform. The motor 202 may be any electronic motor suitable to cause the stabilizing platform to rotate. For example, motor 202 may be controlled to operate by a processor (not shown) similar to or the same as processor 112 of balloon 100. The processor may, for example, control the amount of force (or energy) applied by the motor or the speed at which the motor works. In other examples, motor 202 may be controlled to operate by a processor associated with motion sensor system 206. Example motors may include any alternating motors or direct current motors to name a few.

Power supply 204 may provide power to components of stabilizing platform 200, such as motor 202 and/or motion sensor system 206. Power supply 204 may include a rechargeable lithium-ion or lead-acid battery for storing and discharging electrical energy to the various powered components, for example. In some embodiments, one or more banks of batteries may be configured to provide electrical power. In other embodiments power supply 204 may include both an electrical and mechanical arrangement to provide power to the components (noted above) of stabilizing platform 200. In yet even further embodiments, stabilizing platform 200 may utilize power supply associated with a payload 106 of balloon 100 (e.g., power supply 124) along with power supply 204 to provide power to the components of stabilizing platform 200.

Motion sensor system 206 may generally include one or more sensors configured to detect information about the environment surrounding the stabilizing platform 200 (i.e., the environment of balloon 100). For example, motion sensor system 206 may include a Global Positioning System (GPS) (not shown) and/or an inertial measurement unit (IMU) (not shown). The GPS may be any sensor configured to estimate a geographic location of balloon 100. To this end, GPS may include a transceiver operable to provide information regarding the position of the balloon 100 with respect to the Earth. The IMU may include any combination of sensors (e.g., accelerometers and/or gyroscopes) configured to sense position and orientation changes of balloon 100 based on inertial acceleration. For example, in some embodiments the IMU may include a right laser gyroscope (RLG).

In some embodiments, motion sensor system 206 may communicate with various systems and sensors of a payload such as other systems and sensors 126 of balloon 100. Other components may be included in stabilizing platform 200 as well.

Figure 3A:
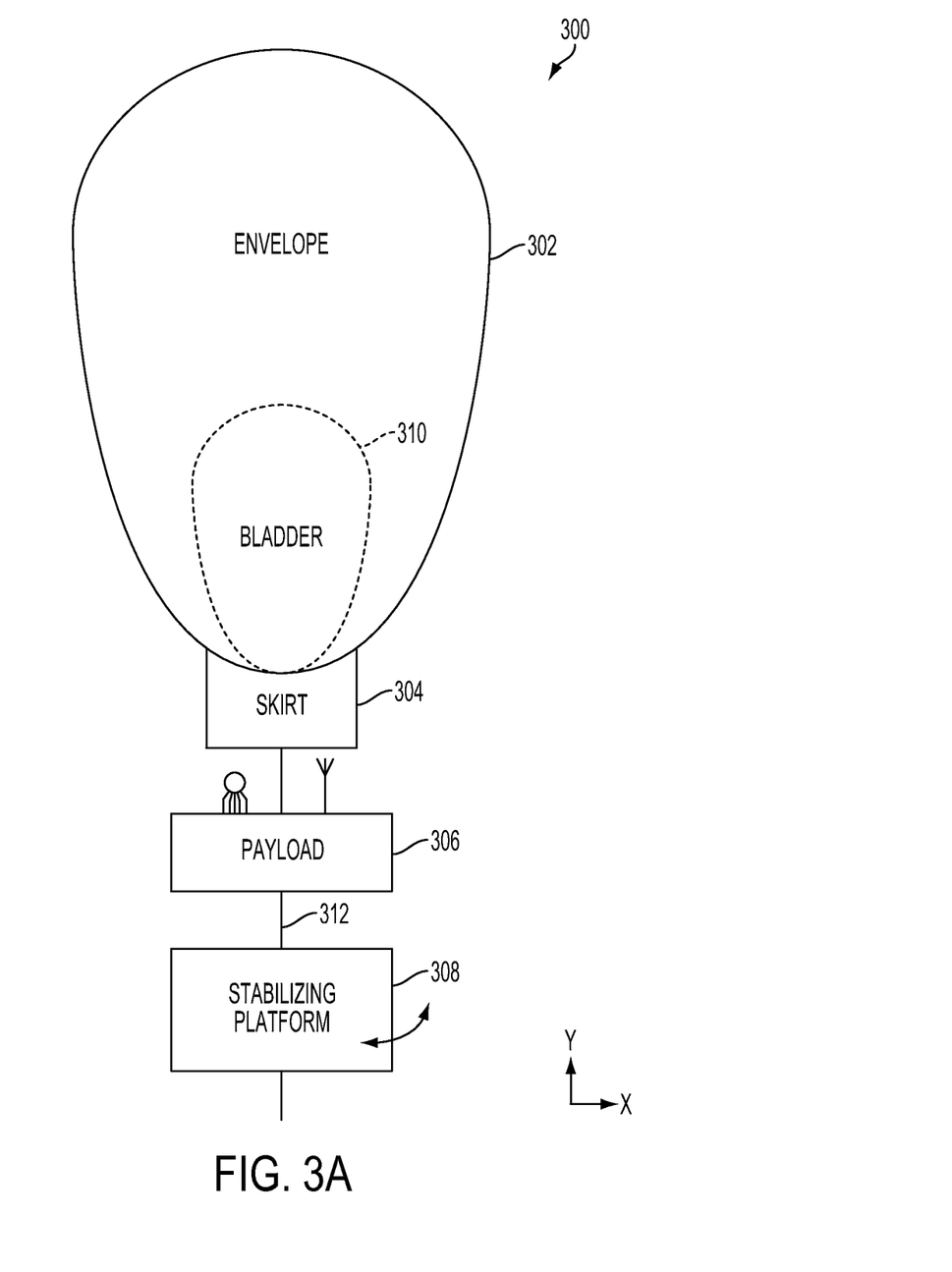
FIG. 3A is a simplified block diagram illustrating a high-altitude balloon with a stabilizing platform, according to an example embodiment.

FIG. 3A is a simplified block diagram illustrating a high-altitude balloon 300 with a stabilizing platform 308, according to an example embodiment. In FIG. 3A, balloon 300 may be the same as or similar to balloon 100 discussed above with reference to FIG. 1, and stabilizing platform 308 may be the same as or similar to stabilizing platform 200 of FIG. 2. As shown, stabilizing platform 308 may be positioned beneath envelope 302 and operatively connected to a fixed component such as skirt 304 via rod 312. Rod 312 may be vertically aligned with gravity (for purposes of FIGS. 3A and 3B the direction of gravity corresponds to the Y axis). In other examples, the fixed component may be a different structure that is affixed to envelope 302 such as any of the mechanisms for heating and/or cooling the gas in bladder 310, and the vertical axis may be defined using a different component other than a rod. For example, the vertical axis may be a rope or a cable that remains in a substantially fixed position aligned with gravity.

To connect to rod 312, stabilizing platform 308 may utilize a rotation bearing that may allow stabilizing platform 308 to rotate freely around rod 312. However, a rotation bearing is intended to be an example, and any bearing or mechanism may be used that may facilitate the rotation of stabilizing platform 308 around rod 312. Stabilizing platform 308 may, for example, connect to rod 312 using attachment points 314a, 314b, which are shown in FIG. 4.

Figure 4:
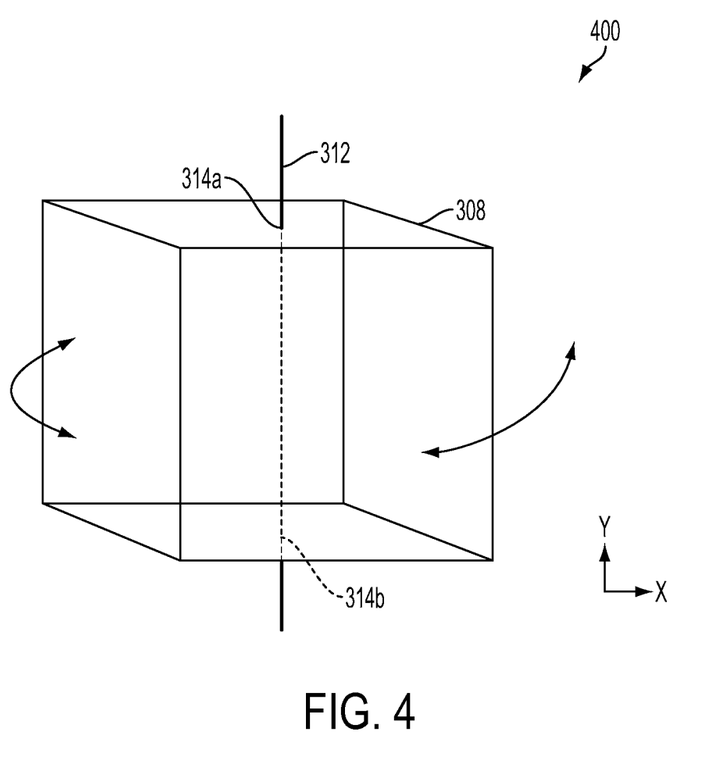
FIG. 4 is a three-dimensional (3D) view of a stabilizing platform configured to rotate around a vertical axis, according to an example embodiment.

FIG. 4 illustrates a three-dimensional (3D) perspective of stabilizing platform 308 operatively connected to rod 312 using two connection points 314a, 314b. In FIG. 4, a rotation bearing (not shown) may be placed at each connection point 314a, 314b thereby allowing stabilizing platform 308 to rotate freely around rod 312. Accordingly, stabilizing platform 308 may be rotated with minimal force because stabilizing platform 308 may naturally rotate around rod 312. For example, stabilizing platform 308 may rotate around rod 312 along the x-axis using a motor similar or the same as motor 202 and power supply similar to or the same as power supply 204 to exert a force on stabilizing platform 308 in a manner such that stabilizing platform 308 rotates. The motor of stabilizing platform 308 (not shown) may be configured to exert a force on the stabilizing platform in a manner such that the stabilizing platform 308 rotates (i) more than a rotation of balloon 300 (e.g., envelope 302 of balloon 300) to which it is connected and (ii) around the axis (or rod 312). This is shown with the arrows in FIG. 4.

Returning back to FIG. 3A, balloon 300 may utilize the components of payload 306 (such as those described with reference to payload 106 of FIG. 1) as a control system to, for example, determine a predetermined orientation and rotation of the balloon. Thereafter if balloon 300 determines a differential in the orientation and rotation, balloon 300 may and operate the motor of stabilizing platform 308 to exert force on the stabilizing platform in the manner such that the stabilizing platform rotates (i) more than the rotation of the balloon and (ii) around the axis, thereby counteracting the rotation of the balloon by causing the stabilizing platform to exert another force on the envelope of the balloon to return the balloon to the predetermined orientation.

Figure 3B:
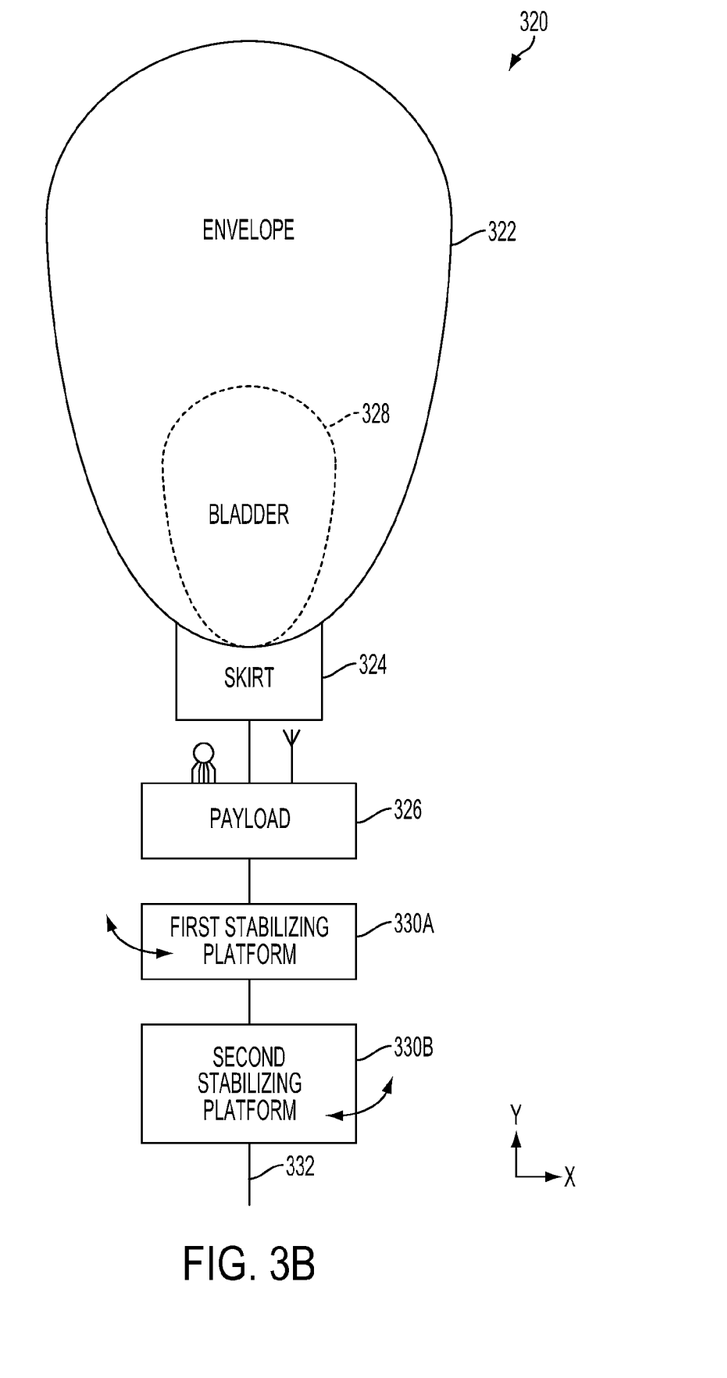
FIG. 3B is a simplified block diagram illustrating a high-altitude balloon with two stabilizing platforms, according to an example embodiment.

FIG. 3B illustrates a simplified block diagram of a high altitude balloon 320 with two stabilizing platforms: first stabilizing platform 330A and second stabilizing platform 330B. Similar to balloon 300 in FIG. 3A, in FIG. 3B balloon 320 may be the same as or similar to balloon 100 discussed above with reference to FIG. 1. Also similar to balloon 300 of FIG. 3A, stabilizing platform 330A of balloon 320 may be positioned beneath envelope 322 and operatively connected to a fixed component such as skirt 324 via rod 332. Additionally, stabilizing platform 330A may be the same as or similar to stabilizing platform 308 described above and may be operatively connected to rod 322 in a similar or the same manner discussed above with regard to FIG. 3A and FIG. 4.

In the example shown in FIG. 3B, balloon 320 may also include a second stabilizing platform 330B that may be positioned beneath the envelope 322 and stabilizing platform 330A, and may be operatively connected to the stabilizing platform 330A. Second stabilizing platform 330B may be similar to or the same as stabilizing platform 330A, and may be operatively connected to rod 332 in the same fashion or a similar fashion as that of 330A as described above. Accordingly, stabilizing platforms 330A and 330B may rotate around rod 332 (vertical axis) along the x-axis using a motor that may exert a force on stabilizing platforms 330A and 330B in the manner noted above with regard to FIG. 4.

In other embodiments (not shown) balloon 320 may include a plurality of stabilizing platforms that may be operatively connected to stabilizing platform 330A. The plurality of stabilizing platforms may be positioned beneath envelope 322 and stabilizing platform 330A and may be configured to rotate around rod 332 along the x-axis using motors that may exert forces on the plurality of stabilizing platforms in the manner noted above with regard to FIG. 4.

Figure 5:
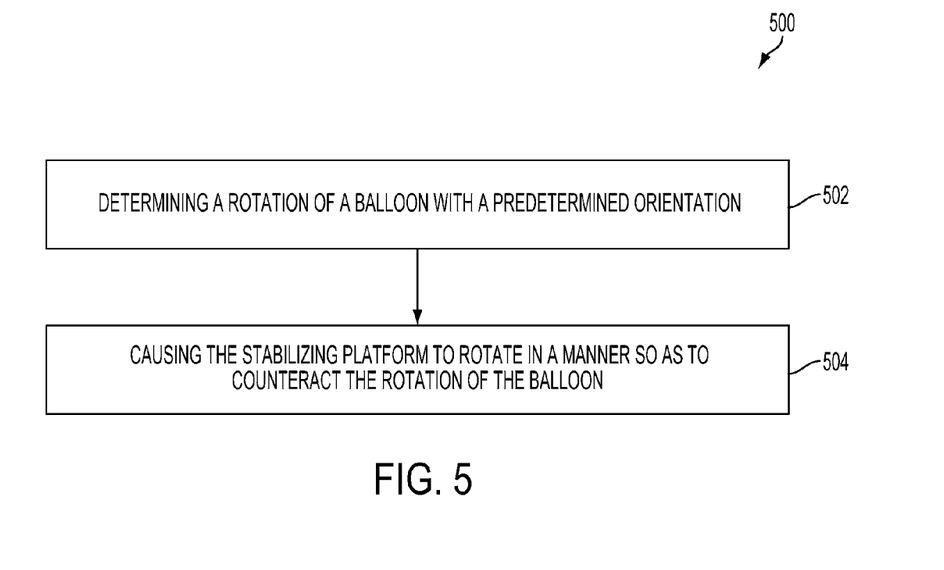
FIG. 5 is a block diagram of a method, according to an example embodiment.

FIG. 5 illustrates a method that may be performed by a high-altitude balloon with a stabilizing platform such as balloon 300 of FIG. 3A. As noted above, balloon 300 may be the same as or similar to balloon 100 discussed above with reference to FIG. 1, and stabilizing platform 308 may be the same as or similar to stabilizing platform 200 of FIG. 2. Accordingly, for example, the processes described herein may be carried out by a gyroscope or accelerometer of other systems and sensors 126 in communication with processor 112.

It is noted that the functionality described in connection with the flowcharts described herein can be implemented as special-function and/or configured general-function hardware modules, portions of program code executed by a processor (e.g., processor 112) for achieving specific logical functions, determinations, and/or steps described in connection with the flowchart shown in FIG. 5. Where used, program code can be stored on any type of computer-readable medium (e.g., computer-readable storage medium or non-transitory media, such as the memory 114 described above with respect to balloon payload 106 and/or a computer program product 700 described below), for example, such as a storage device including a disk or hard drive.

In addition, although the blocks are illustrated in a sequential order, these blocks may also be performed in parallel, and/or in a different order than those described herein. Also, the various blocks may be combined into fewer blocks, divided into additional blocks, and/or removed based upon the desired implementation.

First at block 502, method 500 involves determining a rotation of a balloon with a predetermined orientation. The rotation and orientation of balloon 300 may be determined for example, using processor 112 in combination with one or more of an accelerometer, gyroscope, and/or compass of other systems and sensors 126. In other examples the rotation and orientation of balloon 300 may be determined by determining a movement associated with a communication device of the balloon. For example, an orientation and rotation may be determined for an antenna such as antenna 122 (not shown). In other examples, however, the determination may be based on any other movement that helps define a position and orientation of the communication device.

Figure 6:
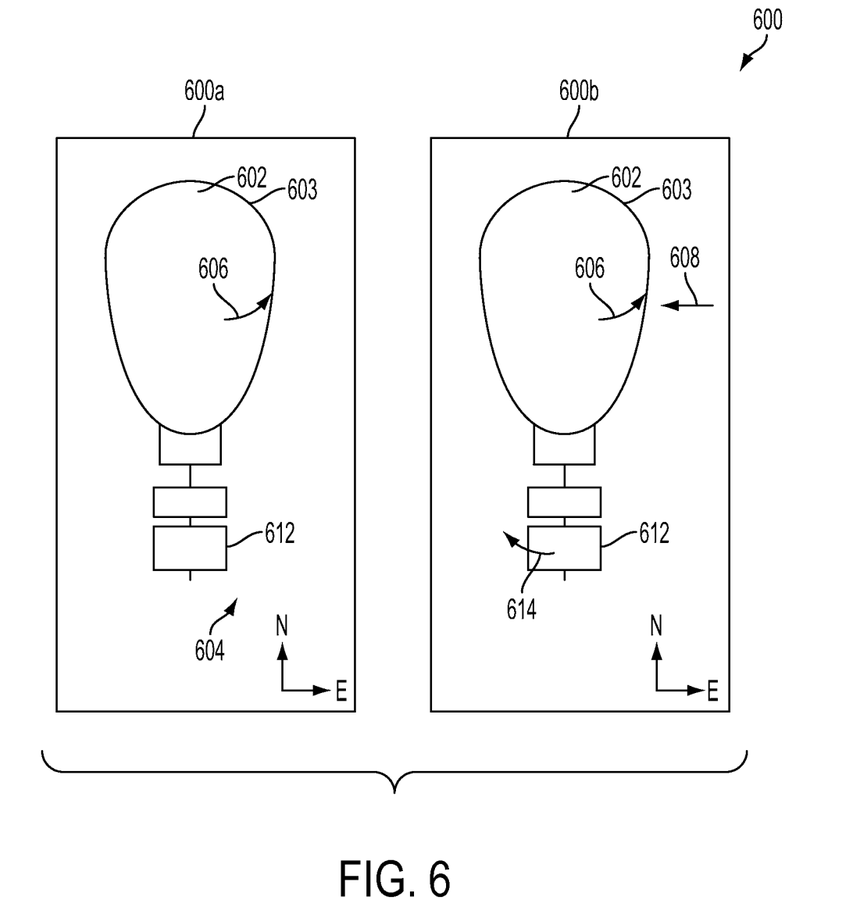
FIG. 6 is a high-altitude balloon operating scenario, according to an example embodiment.

For example, balloon 602 of scenario 600 shown in FIG. 6, may be operating at a high-altitude along a certain trajectory or with a certain orientation. In this scenario, balloon 602 may begin with a straight north heading and its envelope 603 may have minimal rotation (not shown). Unexpectedly, balloon 602 may experience excessive winds or unexpected wind patterns that cause balloon envelope 603 (and thereby balloon 602) to rotate. Periodically monitoring its orientation using, for example, processor 112 and various other systems and sensors 126, balloon 602 may determine, due to the excessive and/or unexpected winds, a rotational and/or orientation differential from its original trajectory and orientation. For instance, referring to stage 600a of scenario 600, using a processor and a RLG, balloon 602 may determine that it now has a heading 604 of northeast, and using a rotation interface balloon 602 may determine that it has a rotational direction 606 of east.

Once a rotation of the balloon has been determined, at block 504, method 500 involves causing the stabilizing platform to rotate in a manner so as to counteract the rotation of the balloon thereby returning the balloon to the pre-determined orientation.

Referring to scenario 600, if the new orientation and rotation of the balloon is undesirable (e.g., the balloon is determined to be rotating in a manner that may alter its desired orientation) a stabilizing platform similar to those discussed above may be used to counteract this undesired rotation and re-orient the balloon. To do so, for example, processor 112 may cause motor such as motor 202 to rotate the stabilizing platform 612 in the manner that counteracts the rotation of the balloon.

Rotating a stabilizing platform in a manner that counteracts the rotation of the balloon may include, for example, rotating a stabilizing platform in a manner greater than the rotation of a balloon and opposite to the rotation of the balloon. In embodiments with two stabilizing platforms, rotating stabilizing platforms in a manner that counteracts the rotation of the balloon may include, for example, rotating a first stabilizing platform in a manner greater than the rotation of a balloon and opposite to the rotation of the balloon and rotating a second stabilizing platform in a manner greater than the rotation of the first stabilizing platform and opposite to the rotation of the first stabilizing platform. In embodiments with two or more stabilizing platforms, rotating the stabilizing platforms in a manner that counteracts the rotation of a balloon may include, for example, rotating the stabilizing platforms in various directions so that, taken together, the rotation of the stabilizing platforms counteract the rotation of the balloon.

For example, the determination that balloon 602 has a heading 604 of northeast a rotational direction 606 of east may not be desirable. As such, balloon 602 may attempt to counteract the rotational direction 606 and orientation 604 by rotating stabilizing platform 612 in a direction 614 opposite to the rotation of the balloon 606. This is shown in stage 600*b*. In stage 600*b*, stabilizing platform 612 is rotating in a direction 614 and thereby exerting a force 608 on balloon envelope 603. Because the weight of envelope 603 of balloon 602 may be heavier than stabilizing platform 612, stabilizing platform 612 can rotate freely without causing balloon 602 to begin spinning out of control. In other words, force 608 that may be exerted on balloon 602 may help balloon 602 to stop rotating east and may help re-orient balloon 602 to a straight north heading while allowing the balloon to generally maintain its position as force 608 may, overtime, be offset or damped out in the form of viscous drag.

Example methods, such as method 500 of FIG. 5 may be carried out in whole or in part by the balloon and its subsystems. Accordingly, example methods could be described by way of example herein as being implemented by the balloon. However, it should be understood that an example method may be implemented in whole or in part by other computing devices. For example, an example method may be implemented in whole or in part by a server system, which receives data from a device such as those associated with the balloon. Other examples of computing devices or combinations of computing devices that can implement an example method are possible.

In some embodiments, any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium. In addition, circuitry may be provided that is wired to perform logical functions in any processes or methods described herein.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and examples have been disclosed herein, other aspects and examples will be apparent to those skilled in the art. The various aspects and examples disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

I claim:

1. A balloon comprising:
    an envelope comprising a fixed component;
    a stabilizing platform positioned beneath the envelope and operatively connected to the fixed component, wherein the stabilizing platform is configured to rotate around an axis vertically aligned with gravity, and wherein the envelope comprises a heavier mass than the stabilizing platform; and
    a motor configured to exert a first force on the stabilizing platform in a manner such that the stabilizing platform rotates (i) more than a rotation of the balloon and (ii) around the axis, thereby counteracting the rotation of the balloon by causing the stabilizing platform to exert a second force on the envelope of the balloon.

2. The balloon of claim 1, further comprising a control system configured to:
    determine the rotation of the balloon, wherein the balloon has a predetermined orientation; and
    operate the motor to exert the first force on the stabilizing platform in the manner such that the stabilizing platform rotates (i) more than the rotation of the balloon and (ii) around the axis, thereby counteracting the rotation of the balloon by causing the stabilizing platform to exert the second force on the envelope of the balloon to return the balloon to the predetermined orientation.

3. The balloon of claim 2,
    wherein the control system comprises at least one of an accelerometer or a gyroscope, and
    wherein the rotation of the balloon with the predetermined orientation is determined using the at least one of the accelerometer or the gyroscope.

4. The balloon of claim 3, wherein the gyroscope comprises a ring laser gyroscope (RLG).

5. The balloon of claim 1,
    wherein the axis vertically aligned with gravity comprises a rod operatively connected to the fixed component, and
    wherein the stabilizing platform rotates around the rod.

6. The balloon of claim 1, further comprising:
    a second stabilizing platform operatively connected to the stabilizing platform, wherein the second stabilizing platform is positioned beneath the envelope and the stabilizing platform and is configured to rotate around the axis; and
    a second motor configured to exert a third force on the second stabilizing platform in a manner such that the second stabilizing platform rotates (i) more than a rotation of the stabilizing platform (ii) in a direction opposite to that of the stabilizing platform and (iii) around the axis, thereby counteracting the rotation of the balloon by causing the second stabilizing platform to exert a fourth force on the envelope of the balloon.

7. The balloon of claim 1,
wherein the stabilizing platform has a fixed heading, and the balloon further comprising:
a plurality of stabilizing platforms operatively connected to the stabilizing platform, wherein the plurality of stabilizing platforms are positioned beneath the envelope and the stabilizing platform and are configured to rotate around the axis; and
a plurality of motors configured to exert first forces on the plurality of stabilizing platforms in a manner such that the plurality of stabilizing platforms rotate around the axis thereby counteracting the rotation of the stabilizing platform by causing the plurality of stabilizing platforms to exert second forces on the stabilizing platform of the balloon.

8. A method comprising:
determining, using a processor, a rotation of a balloon with a predetermined orientation, wherein the balloon comprises an envelope and a stabilizing platform, wherein the envelope comprises a fixed component, wherein the stabilizing platform (i) is operatively connected to the fixed component, (ii) is positioned beneath the envelope, (iii) is configured to rotate around an axis vertically aligned with gravity, and (iv) comprises a motor; and
causing, using the motor, the stabilizing platform to rotate more than the rotation of the balloon and around the axis to counteract the rotation of the balloon thereby returning the balloon to the predetermined orientation.

9. The method of claim 8, wherein causing the stabilizing platform to rotate in the manner so as to counteract the rotation of the balloon comprises causing, using the motor, the stabilizing platform to rotate in a manner opposite to the rotation of the balloon.

10. The method of claim 8, wherein determining the rotation of the balloon with the predetermined orientation comprises:
determining a movement associated with a communication device of the balloon with respect to the predetermined orientation, wherein the communication device is operatively connected to the balloon.

11. The method of claim 10, wherein the movement comprises a rotation, and wherein the communication device comprises an antenna.

12. The method of claim 8, wherein the balloon further comprises a second stabilizing platform, wherein the second stabilizing platform (i) is operatively connected to the stabilizing platform, (ii) is positioned beneath the envelope and the stabilizing platform, (iii) is configured to rotate around the axis, and (iv) comprises a second motor,
the method further comprising causing, using the second motor, the second stabilizing platform to rotate in a manner so as to further counteract the rotation of the balloon thereby returning the balloon to the predetermined orientation.

13. The method of claim 12, wherein causing, using the second motor, the second stabilizing platform to rotate in the manner so as to further counteract the rotation of the balloon thereby returning the balloon to the predetermined orientation comprises causing the second stabilizing platform to rotate in a manner opposite to the rotation of the stabilizing platform.

14. The method of claim 8, wherein the balloon further comprises a plurality of stabilizing platforms, wherein the plurality of stabilizing platforms are (i) operatively connected to the stabilizing platform, (ii) positioned beneath the envelope and the stabilizing platform, (iii) configured to rotate around the axis, and (iv) comprise a plurality of motors,
the method further comprising causing, using the plurality of motors, the plurality of stabilizing platforms to rotate in a manner so as to counteract the rotation of the balloon thereby returning the balloon to the predetermined orientation.

15. The method of claim 14, wherein causing, using the plurality of motors, the plurality of stabilizing platforms to rotate in a manner so as to counteract the rotation of the balloon thereby returning the balloon to the predetermined orientation comprises causing each stabilizing platform of the plurality of stabilizing platforms to rotate in a manner that offsets a rotation associated with the other stabilizing platforms of the plurality of stabilizing platforms.

16. A non-transitory computer readable medium having stored therein instructions that when executed by a computer system of a balloon, cause the balloon to perform functions comprising:
determining a rotation of the balloon, wherein the balloon has a predetermined orientation, wherein the balloon comprises an envelope and a stabilizing platform, wherein the envelope comprises a fixed component, wherein the stabilizing platform (i) is operatively connected to the fixed component, (ii) is positioned beneath the envelope, (iii) is configured to rotate around an axis vertically aligned with gravity, and (iv) comprises a motor; and
causing, using the motor, the stabilizing platform to rotate more than the rotation of the balloon and around the axis to counteract the rotation of the balloon thereby returning the balloon to the predetermined orientation.

17. The non-transitory computer readable medium of claim 16,
wherein the balloon further comprises a second stabilizing platform, wherein the second stabilizing platform (i) is operatively connected to the stabilizing platform, (ii) is positioned beneath the envelope and the stabilizing platform, (iii) is configured to rotate around the axis, and (iv) comprises a second motor, and
wherein the instructions are further executable by the computer system of the balloon to perform functions comprising:
causing, using the second motor, the second stabilizing platform to rotate in a manner so as to further counteract the rotation of the balloon thereby returning the balloon to the predetermined orientation.

18. The non-transitory computer readable medium of claim 17, wherein the instructions are further executable by the computer system of the balloon to perform functions comprising:
causing the second stabilizing platform to rotate in a manner opposite to the rotation of the stabilizing platform.

19. The non-transitory computer readable medium of claim 16,
wherein the balloon further comprises a plurality of stabilizing platforms, wherein the plurality of stabilizing platforms are (i) operatively connected to the stabilizing platform, (ii) positioned beneath the envelope and the stabilizing platform, (iii) configured to rotate around the axis, and (iv) comprise a plurality of motors, and wherein the instructions are further executable by the computer system of the balloon to perform functions comprising:

causing, using the plurality of motors, the plurality of stabilizing platforms to rotate in a manner so as to counteract the rotation of the balloon thereby returning the balloon to the predetermined orientation.

20. The non-transitory computer readable medium of claim 19, wherein the instructions are further executable by the computer system of the balloon to perform functions comprising:

causing each stabilizing platform of the plurality of stabilizing platforms to rotate in a manner that offsets a rotation associated with the other stabilizing platforms of the plurality of stabilizing platforms.

* * * * *